Jan. 28, 1947.  D. GLAZER  2,414,942
STICK POSITIONING DEVICE
Filed Dec. 13, 1943  2 Sheets-Sheet 1
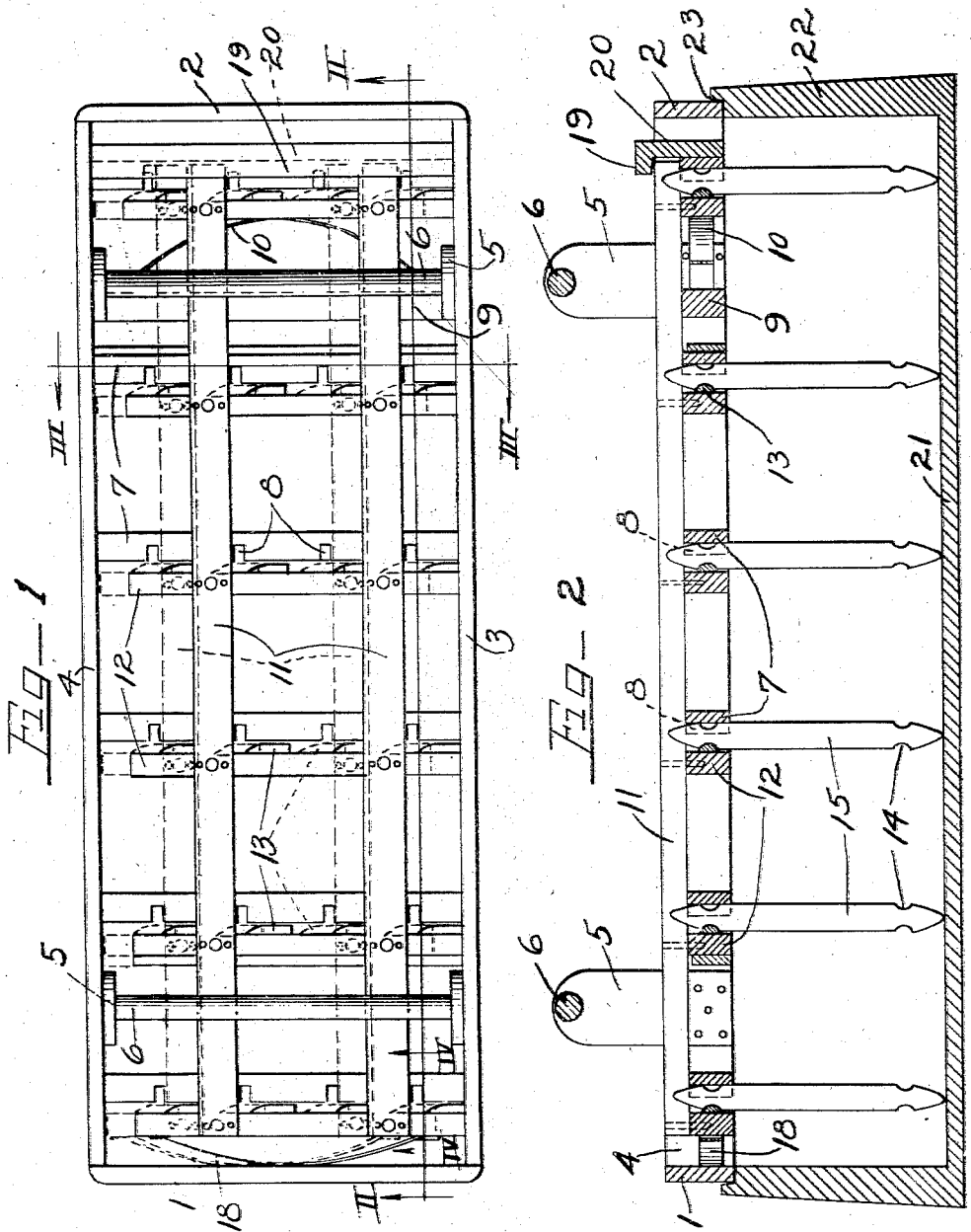
INVENTOR
Daniel Glazer

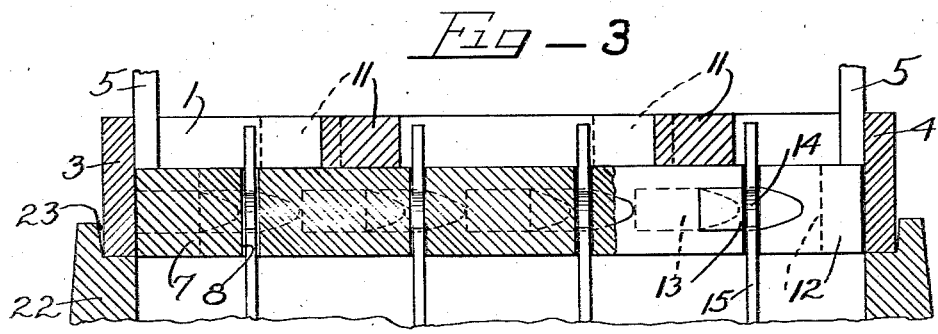
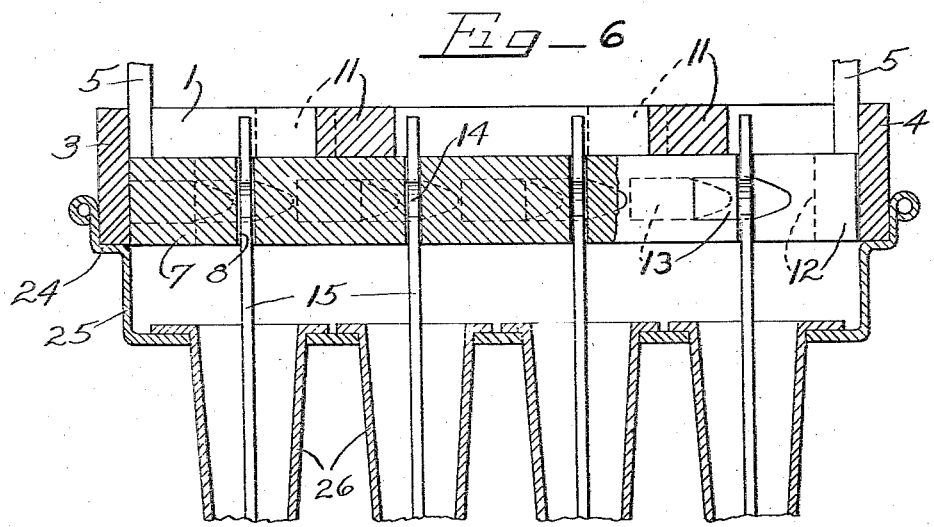
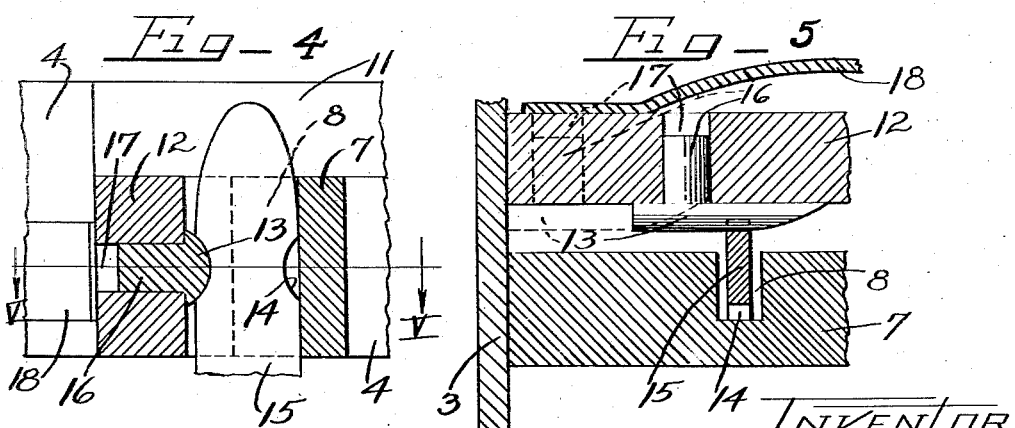

Patented Jan. 28, 1947

2,414,942

UNITED STATES PATENT OFFICE 2,414,942

STICK POSITIONING DEVICE

Daniel Glazer, Chicago, Ill., assignor to Frigie Corporation of America, Chicago, Ill., a corporation of Illinois Application December 13, 1943, Serial No. 514,056

5 Claims. (Cl. 294—87)

The present invention pertains to that art of manufacturing frozen confections and the like and more particularly to a device and method for simultaneously gripping and retaining a plurality of confection sticks in releasably latched suspended engagement in a stick carrying tray adapted when loaded to be transferred and placed in cooperative relationship with mold forms containing a confection for receiving the sticks to permit the confection to congeal and adhere to the sticks to form confections removable with the tray and simultaneously releasably therefrom.

It is an object of the invention to provide an improved device for releasably engaging, carrying and positioning confection sticks in confection molds, said device constructed with improvements for increasing the assembly, adaptability and efficiency thereof for the production of frozen merchantable confections and the like.

It is also an object of the invention to provide a confection stick carrying apparatus wherein the sticks may first be properly disposed in a positioning plane and are then simultaneously gripped by a shiftable means wedgingly retaining the sticks to permit confections to be applied thereto before simultaneously releasing the produced commodities.

It is a further object of the invention to produce a device for conveniently positioning, gripping and dipping confection sticks for producing frozen commodities and the like.

It is furthermore an object of this invention to provide a confection stick positioning and gripping tray whereby a plurality of confection sticks are first dropped through the tray into contact with a leveling means for positioning the upper ends of the sticks in the same plane to permit the sticks to be simultaneously gripped by a spring controlled frame shiftably engaged in the tray for holding the sticks suspended for insertion into confection molds for the formation of shaped confections on the sticks.

Still another object of the invention is the provision of a confection stick positioning apparatus whereby a portable tray is provided with a spring controlled shiftable frame carrying wedge members for engagement in notched sticks while the lower ends thereof are contacting a stick leveling plate to position the notched upper ends of the sticks at the level of the wedge members.

It is an object of the invention to provide an improved method of manufacturing frozen sticked confections by leveling a plurality of confection sticks and then simultaneously pressure wedging the same in suspended position to be lowered into confection cavities and permitting the confection to congeal and adhere to the sticks to produce merchantable commodities.

Other and further objects of the invention will be apparent from the disclosures in the specification and the accompanying drawings.

The invention (in a preferred form) is illustrated in the drawings and hereinafter more fully described.

On the drawings:

Figure 1 is a plan view of a confection stick positioning and carrying device embodying the principles of this invention.

Figure 2 is a longitudinal vertical sectional view taken on line II—II of Figure 1, and supported on a stick leveling unit.

Figure 3 is an enlarged fragmentary transverse sectional view taken on line III—III of Figure 1 and illustrating the locking frame shifted into stick gripping position and showing the normal position of the frame in dotted lines.

Figure 4 is an enlarged fragmentary detailed sectional view taken on line IV—IV of Figure 1.

Figure 5 is a fragmentary detailed horizontal section taken on line V—V of Figure 4.

Figure 6 is a fragmentary transverse sectional view of the stick positioning and carrying device seated in a confection carrying mold including individual molds into which the confection sticks project for the molding of confections thereon.

As shown on the drawings:

The invention relates to a confection manufacturing apparatus or device consisting of a confection stick gripping and carrying tray unit, a stick gauge or aligning unit for coactive use therewith, and a mold unit for supporting the tray unit and receiving the confection sticks in mold cavities.

The portable tray unit, forming the main feature of this invention, comprises a main or outer frame formed of end bars or members 1 and 2 connected by longitudinal side members or rails 3 and 4. Secured to the frame rails 3 and 4, are upwardly projecting handle supports 5 arranged in pairs near the ends of the main frame to carry handle bars or rods 6 by which the tray may be carried.

Secured transversely within the main frame are a plurality of spaced parallel crossbars 7 the ends of which are secured to the frame rails 3 and 4. Each of the crossbars 7 is provided in one side thereof with a plurality of stick receiving slots or notches 8. Secured transversely in the main frame between two of the handle supports 5 is a brace or supporting bar 9. Fastened to one side of the bar 9 are the two ends of a bow spring 10 which serves as a resilient cushioning and retaining means for assisting in retaining an inner auxiliary frame or stick gripping rack transversely shiftable within the main frame of the tray.

The stick gripping auxiliary frame or rack comprises a pair of parallel spaced longitudinal rails or bars 11 which are adapted to be disposed longitudinally in the main frame supported upon the top faces of the frame crossbars 7 on which they are adapted to be shifted. The rails 11 are connected by means of a plurality of spaced parallel tie bars 12 which are secured transversely across the bottom faces of said rails 11. When the auxiliary frame or rack is in position within the tray the rack tie bars 12 are positioned adjacent the notched sides of the main frame crossbars 7 and are separated therefrom by means of stick gripping and locking wedge bolts 13. The wedged or locking bolts 13 are formed with a curved outer face having a tapered tip at one end thereof to facilitate the locking or gripping engagement of the wedge bolts 13 in one of the upper curved notches 14, two of which are provided in the side edges near each end of each of the confection sticks 15 to be gripped and carried by the tray as hereinafter described. Each of the wedge bolts 13 is provided with a shank pin or stud 16 which is frictionally driven into one of the receiving openings 17 provided in each of the tie bars 12 as shown in Figures 4 and 5 to hold the flat side of the wedge bolt 13 flatly engaged against the side of a rack tie bar 12.

Secured to the outer side face of the first tie bar 12 from the left, looking at Figure 1, are the ends of a bow spring 18 which is positioned to have slidably resilient contact with the inner face of the frame end bar 1 when the stick rack or auxiliary frame is shifted in the main frame of the tray. When the wedge bolt rack or inner frame is engaged in the tray main frame the bow spring 10 resiliently contacts a side face of the tie bar 12 at the right hand end of the rack. One end of the wedge bolt rack or inner shiftable frame when inserted into the tray is adapted to have the ends of the rack rails 11 engaged beneath a top flange 19 of a lock or retaining bar 20 secured transversely within one end of the main frame between the frame rails 3 and 4 with the flange 19 projecting over the first cross bar 7 from the right hand end of the tray as shown in Figure 2.

It will be noted that the bow spring 10 is mounted in the stationary main frame near one end of the tray and that the bow spring 18 is mounted on one end of the inner frame or rack. The springs are bowed in opposite directions and resiliently hold and cushion the inner frame braced in position to permit the inner frame to be transversely shifted back and forth within the main frame to wedgingly grip or release notched confection sticks 15 depending upon the direction of shifting of said inner frame. When the inner frame is shifted the bow spring 18 slides on the end frame member 1 while the first crossbar 7 from the right slidably moves on the bow spring 10. The springs 10 and 18 act to resiliently press the frames against one another and also serve as cushioning means between the frames. The springs also act to restrain the shifting movements of the frames into and out of stick latching position.

For the purpose of simultaneously aligning and gripping a plurality of confection sticks 15 in the tray, a combination tray support and stick gauge unit is provided for cooperation with the tray unit. The supporting and gauging unit comprises a gauge or alignment plate 21 having supporting uprights 22 formed or supported thereon. The uprights 22 are formed with top recess at 23 to permit the ends of the main tray frame to be seated therein to position the tray at a predetermined distance above the gauge plate 21 to permit said plate to serve as a stop against which the lower notched ends of the confection sticks 15 may rest to bring the upper notched ends of said sticks in alignment with the upper notches 14 disposed in a common plane and in alignment across the tray adjacent the gripping wedges or latch bolts 13.

While the stick and aligning gauge unit has been described as comprising a gauge plate with grooved end supports for supporting the tray unit at a predetermined level above the gauge plate, it is to be understood that the gauge unit may consist of a gauge or stick leveling box consisting of a bottom 21 with side and end walls 22 grooved at 23 to form a recessed seat for the reception of the tray unit.

It will thus be noted that a simplified method is provided for positioning and aligning sticks to be releasably engaged and suspended in the portable tray unit ready to be projected into confection molds. The method consists of merely seating the tray unit on the gauge supports 22 as shown in Figure 2, with the auxiliary or wedging frame in its normal release position as illustrated in full lines in Figure 1. This arrangement leaves the stick notches 8 in the main frame open. A plurality of notched confection sticks 15 are then dropped into the tray slots 8 and are guided by the slots to slide downwardly until the lower tips or ends of the sticks contact the stop or gauge plate 21 thereby aligning or positioning the upper stick notches 14 in a common plane and in the plane of the wedges or bolts 13. The spring controlled wedge frame or tray rack is now manually shifted transversely in the main frame from the full line position of Figure 1 into the dotted line position thereby simultaneously causing the bolts 13 to slide across the upper ends of the sticks and wedgingly engage in the adjacent stick notches 14 as shown in Figures 4 and 5 to simultaneously wedge or lock the sticks in suspended spaced relationship in the portable tray unit.

With the confection sticks properly gripped in suspended form, the tray unit is lifted by means of the handles 6, and is transferred with the suspended sticks and deposited in a grooved seat 24 formed in the top of a confection mold housing or body 25 formed with a plurality of individual confection containing molds or forms 26, into the cavities of which the lower notched ends of the suspended sticks 15 are selectively projected to permit the confection to congeal and adhere to the notched sticks to form shaped molded confections on the sticks.

After the confections have been molded onto the sticks the tray unit is lifted, by means of the handles 6, off of the mold unit to permit the formed confections to be simultaneously released from the carrying tray by manually shifting the wedge frame or rack back into its normal full line release position of Figure 1, thereby permitting the released confections to be deposited into a suitable receiver to be wrapped and packed ready for commercial distribution and sale.

It will, of course, be understood that various details of construction and steps in the carrying out of the method may be varied without departing from the principles of this invention, and it is, therefore, not the purpose to limit the patent granted hereon otherwise than necessitated by the scope of the appended claims.

I claim:

1. A stick confection apparatus for cooperative use with a stick positioning gauge and then with a confection mold mechanism, said apparatus comprising a main frame, handle means for carrying the same, cross members in said frame and having notches in one side thereof adapted to have sticks engaged therein, an auxiliary frame shiftably mounted in the main frame, means on the main frame for releasably retaining the auxiliary frame in said main frame, a bow spring secured on the auxiliary frame in slidable contact with the main frame for resiliently holding the auxiliary frame in place to co-act with the auxiliary frame retaining means, crossbars forming part of the auxiliary frame and positioned adjacent the notched sides of said cross members and resiliently forced by said spring toward the cross members, and wedge means on the crossbars frictionally held against the notched sides of the cross members, said auxiliary frame shiftable in the main frame to move the wedge means into latching engagement with the sticks to uniformly hold the same suspended in the main frame.

2. A stick confection apparatus for cooperative use with a stick positioning gauge and then with a confection mold, said apparatus comprising a main frame, handle means for carrying the same, cross members in said frame and having notches in one side thereof adapted to have sticks engaged therein, an auxiliary frame shiftably mounted in the main frame, means on the main frame for releasably retaining the auxiliary frame seated in the main frame, a bow spring secured on the main frame for resiliently holding the auxiliary frame in place to co-act with the retaining means, crossbars forming part of the auxiliary frame and positioned adjacent the notched sides of said cross members and resiliently forced by said spring toward the cross members, and wedge means on the crossbars frictionally held against the notched sides of the cross members, said auxiliary frame shiftable transversely in the main frame to move the wedge means into latching engagement with the sticks to hold the same suspended in the main frame.

3. A stick confection apparatus for cooperative use with a stick positioning gauge and then with a confection mold to have a confection molded on the sticks, said apparatus comprising a main frame, handle means for carrying the same, cross members in said frame and having notches therein adapted to have sticks engaged therein, an auxiliary frame shiftably mounted in the main frame, retaining means on the main frame for releasably retaining the auxiliary frame seated in the main frame, a spring secured to the main frame and engaging the auxiliary frame, a spring secured on the auxiliary frame and engaging against the main frame, said springs acting to resiliently hold the auxiliary frame longitudinally cushioned in the main frame and controlling the transverse shifting of the auxiliary frame, crossbars forming part of the auxiliary frame and positioned adjacent the notched cross members and resiliently directed toward the same by the action of the springs, and wedge means on the crossbars frictionally held against the notched cross members, said auxiliary frame shiftable transversely in the main frame to move the wedge means into latching engagement with the sticks in said slots to hold the sticks suspended in the main frame ready to be projected into the confection when the stick carrying apparatus is transferred from the stick gauge to seat on the confection mold.

4. An apparatus of the class described including a portable main frame having slots therein for receiving sticks, means for carrying the main frame, an auxiliary frame longitudinally and transversely movable in the main frame, spring cushioning means between said frames, and latching means carried by the auxiliary frame for transverse wedging engagement across the edges of the sticks to hold the same suspended in the main frame when the auxiliary frame is moved transversely in the main frame.

5. An apparatus of the class described including a portable main frame having slots therein for receiving sticks, an auxiliary frame longitudinally and transversely movable in the main frame, latching means carried by the auxiliary frame for co-action with said slots to hold the sticks latched in suspended position in the main frame when the auxiliary frame is moved transversely in the main frame, and cushioning springs between said frames and permitting longitudinal movement of the auxiliary frame in said main frame when the auxiliary frame is shifted to move the latching means into and out of engagement with the sticks in the main frame slots.

DANIEL GLAZER.